United States Patent
Sabry et al.

(10) Patent No.: US 6,628,612 B1
(45) Date of Patent: Sep. 30, 2003

(54) DERIVATION OF EQUIVALENT BANDWIDTH OF AN INFORMATION FLOW

(75) Inventors: Martin Sabry, Cambridge (GB); Graeme A Gibbs, Saffron Walden (GB); Rade Gvozdanovic, Harlow (GB); Cho Y Tang, Loughton (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/368,276

(22) Filed: Aug. 3, 1999

(51) Int. Cl.$^7$ ............................................... G01R 31/08
(52) U.S. Cl. ...................... 370/230; 370/230; 370/395.2
(58) Field of Search ................................ 370/229, 230, 370/232, 233, 234, 253, 395.2, 395.1

(56) References Cited

U.S. PATENT DOCUMENTS

| | | | | |
|---|---|---|---|---|
| 5,784,358 A | * | 7/1998 | Smith et al. | 370/230 |
| 5,917,804 A | * | 6/1999 | Shah et al. | 370/230 |
| 6,266,322 B1 | * | 7/2001 | Berger et al. | 370/229 |

FOREIGN PATENT DOCUMENTS

| WO | WO 9528787 A | 10/1995 |
|---|---|---|

OTHER PUBLICATIONS

Roch Guerin et al, "Equivalent Capacity and its Application to Bandwidth Allocation in High–Speed Networks" IEEE journal on Selected Areas in Communications, US, IEEE inc New York, vol. 9 No. 7 dated Sep. 1, 1991, pp. 968–981.*

Performance Evaluation of Connection Admission Control Techniques in ATM Networks (B Jamoussi, S Rabie and O Oboul–Magd) pp. 659–664—1996.

IEE Journal on Selected Areas in Communicatiions Vol 9 No. 7 Sep. 1991 Equivalent Capacity and Its Application to Bandwidth Allocation in High–Speed Networks (Roch Guerin, Hamid Ahmadi and Mahmoud Naghshineh. pp. 968–981.

Call Admission Control Schemes: A Review (Perros and Khaled) IEEE Communications Magazine Nov. 1996.

Roch Guerin et al "Equivalent Capacity and its Application to Bandwidth Allocation in High–Speed Networks" IEEE Journal on Selected Areas in Communications, US, IEEE Inc. New York, vol. 9 No. 7. Sep. 1$^{st}$ 1991, pp. 968–981, p. 970 left hand column, line 1—p. 974 left hand column, line 47.

* cited by examiner

*Primary Examiner*—Douglas Olms
*Assistant Examiner*—Robert W. Wilson
(74) *Attorney, Agent, or Firm*—Barnes & Thornburg

(57) ABSTRACT

A connection admission controller determines whether to admit the requested connection according to whether admission would cause a bandwidth used to exceed a maximum bandwidth allowed. For determining the bandwidth used, an aggregate equivalent bandwidth of all connections is determined by determining a static approximation and a flow approximation, the flow approximation having a non-linear relationship to the number of connections. Using a non linear relationship enables the equivalent available capacity for a number of connections to be determined more accurately with less computational resources.

18 Claims, 4 Drawing Sheets

DERIVATION OF EQUIVALENT BANDWIDTH OF AN INFORMATION FLOW

FIELD OF THE INVENTION

The invention relates to apparatus for connection admission control, to apparatus for resource control in networks, and to corresponding methods, and to software for carrying out such methods.

BACKGROUND TO THE INVENTION

Connection Admission Control is one of a number of known techniques for managing and controlling traffic and congestion in connection-orientated networks. In particular, it is used in ATM (a synchronous transfer mode) networks to provide quality of service (QOS) guarantees. It is not limited to use in ATM networks.

Connection Admission Control (CAC) procedures are used to decide if a request for an ATM connection can be accepted, based on the network capacity and the attributes of both the requested connection and existing connections. This is one application which requires that an equivalent bandwidth be determined accurately both for the new connection and for the existing connections. It is important that there is always enough bandwidth so that quality of service guarantees for the existing connections and the requested connections, can be met.

CAC procedures may be used at an access mode at the edge of an ATM network to enable control of access to the entire route through the ATM network as route selection is made. A second level, may be used at each node along the selected route through the ATM network, to confirm that a respective link beyond that node, can admit the connection.

An estimate of the bandwidth required by the connection, and knowledge of the available bandwidth on each link is required. The CAC algorithm at the network edge uses parameters available from the routing database, and characteristics of the connection being requested (available from signalling information) to determine if an individual link is likely to accept or reject the connection. The link/node is included if it is likely to accept the connection, and excluded from the route selection algorithm if it is unlikely to accept the connection.

After path selection is done, each node along the chosen route executes its own CAC algorithm, using factors such as link capacity, buffering capability or queuing architecture, traffic descriptors, QOS requirements and capacity allocated to different types of traffic or different connections.

Some of these parameters are fixed and some are variable. Queue size and the desired QOS are examples of fixed parameters, whereas the traffic descriptor and current available link capacity are dynamic parameters. The calculation is complex because connections typically use variable rates of ATM cell flow. Such flows can be described statistically using parameters such peak cell rate, and mean burst size. By calculating an effective capacity, also known as effective bandwidth, for individual connection, many connections can share the bandwidth of an individual link more efficiently, without having to provide the peak bandwidth for all connections.

Many algorithms have been proposed for determining the effective capacity of the requested connections, and of existing connections. Some are described in an article entitled "Performance Evaluation of Connection Admission Control Techniques in ATM Networks" by Jamoussi et al, published in a 1996 IEEE journal. This article notes that a good CAC algorithm strives to achieve a balance of the following objectives:

QOS guarantee, execution speed, link efficiency, and simplicity.

A useful summary of admission techniques is an article by Perros and Khaled in IEEE communications magazine November 1996, "Call Admission control schemes, a review". One known technique is shown in an article by Guerin et al entitled "Equivalent capacity and its application to bandwidth allocation" from the IEEE journal on selected areas in communications. Vol 9, no. 7. It involves determining an approximation for the equivalent bandwidth of an individual connection by using a known relationship between parameters of the connection, size of buffer at the Admission control node, and a quality of service matrix which may be probability of overflow, ie cell loss ratio (CLR).

This relationship is complex, and so can only be evaluated by numerical or iterative methods which are too computationally intensive to be usable in a practical network with sufficient accuracy. Accordingly, in Guerin et al, a major factor in this complex relationship, is approximated rather than evaluated. This enables the relationship to be evaluated using normal algebraic methods without requiring a lengthy numerical analysis or iterative method.

To calculate the aggregate equivalent bandwidth of the numerous connections already admitted, so that the available bandwidth can be determined, Guerin et al proposes taking the minimum of two approximations. The first is a static approximation, and the second is a fluid flow approximation. The result is always greater than the real equivalent capacity. The static approximation is representative of the bandwidth required for a large numbers of connections, when the effects of statistical multiplexing become significant. The fluid flow approximation is more representative of actual connection behaviour and so is more useful when the number of connections is small. The static approximation is the sum of the mean bandwidths of the individual connections, which can be measured, plus a proportion of the standard deviation of the aggregated connection. The proportion reflects the desired quality of service, or risk of dropping a connection.

The fluid flow approximation is more difficult to calculate. In Guerin a straightforward summation of the values calculated for individual connections is made. This implies an assumption of a linear relationship between the equivalent bandwidth and the number of connections. In Guerin et al different equivalent capacity values can be calculated for each of several different traffic classes, hence the equivalent bandwidth will depend on both the number of connections, and the traffic class. Nevertheless, the relationships remain linear.

Under particular conditions, such as bursty data traffic, with low numbers of connections, these known methods may overestimate the equivalent capacity by 100 per cent or more. Furthermore, they are still computationally intensive, which can affect the post-dialing delay (PDD), and affect the channel density of nodes in the network.

SUMMARY OF THE INVENTION

According to a first aspect of the invention there is provided admission control apparatus for controlling admission of connections to a network, the apparatus comprising:

circuitry for receiving a request for admitting a connection to the network, circuitry for determining whether to admit the requested connection according to whether a bandwidth used would exceed a maximum bandwidth allowed for at least a portion of the network, circuitry for determining the bandwidth used, by determining an aggregate equivalent bandwidth of all connections in the portion of the network, by determining a static approximation and a flow approximation, the flow approximation having a non-linear relationship to the number of connections.

Using a non linear relationship enables the equivalent available capacity for a number of connections to be determined more accurately with less computational resources. In this context, controlling admission is intended to encompass both controlling whether a connection becomes admitted, and once admitted, whether it remains admitted to the network.

Preferred Features

Preferably, the connections may be of more than one type, and the determination of the flow approximation is made according to the type of the connection.

Preferably the apparatus further comprises a look up table accessible according to the number of connections, for providing an incremental value of equivalent bandwidth for use in the determination of the flow approximation. This can reduce the amount of calculation which needs to be done in real time when a connection is requested. This enables PDD to be reduced, or more connections to be handled for a given amount of processing power in a given time.

Preferably the determination of the approximation is based on a pre-computed numeric evaluation of a relationship between parameters of the connection, a quality of service metric and the equivalent bandwidth. This makes the flow approximation more accurate since the entire relationship can be evaluated, rather than approximating part of it. By pre-computing, the numeric analysis, which is processing-resource-intensive, need not be done in real time when a connection is requested.

Preferably the network is an ATM network.

Preferably the determination of the flow approximation is adjustable in operation according to measurements of actual performance. This enables the admission control to be reactive.

Preferably the parameters of the connection comprise a peak rate value.

Preferably the parameters of the connection comprise a mean duration of an active period, and a fraction of time the connection is actively used.

Other Aspects of the Invention

According to a second aspect of the invention there is provided admission control apparatus for controlling admission of connections to a network, the apparatus comprising:

circuitry for receiving a request for admitting a connection to the network, circuitry for determining whether to admit the requested connection according to whether a total bandwidth used would exceed a maximum bandwidth allowed for at least a portion of the network, circuitry for determining the total bandwidth used, by determining an approximation based on pre computed evaluation of a relationship between parameters of the requested connection, a quality of service metric and the equivalent bandwidth.

According to a further aspect of the invention there is provided apparatus for controlling utilisation of a resource in a network, the apparatus comprising:

circuitry for determining an equivalent bandwidth of an aggregated information flow having a number of constituent flows, in the network, by determining a static approximation and a flow approximation for the equivalent bandwidth, the flow approximation having a non-linear relationship to the number of constituent flows, and circuitry for controlling the resource on the basis of the equivalent bandwidth.

These improvements to the algorithm enable near optimal bandwidth utilisation. They support aggregation of heterogeneous information flows within a single ATM virtual circuit. There is reduced operationally complexity, negligible impact on PDD (post dialling delay, maximal call rate, and simple to prove inter-operability between multiple parties. The proposed CAC algorithm may provide provisionable QOS per virtual circuit.

Other aspect of the invention provides corresponding methods of operation and corresponding software for carrying out the methods.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which.

DETAILED DESCRIPTION

Figure 1:
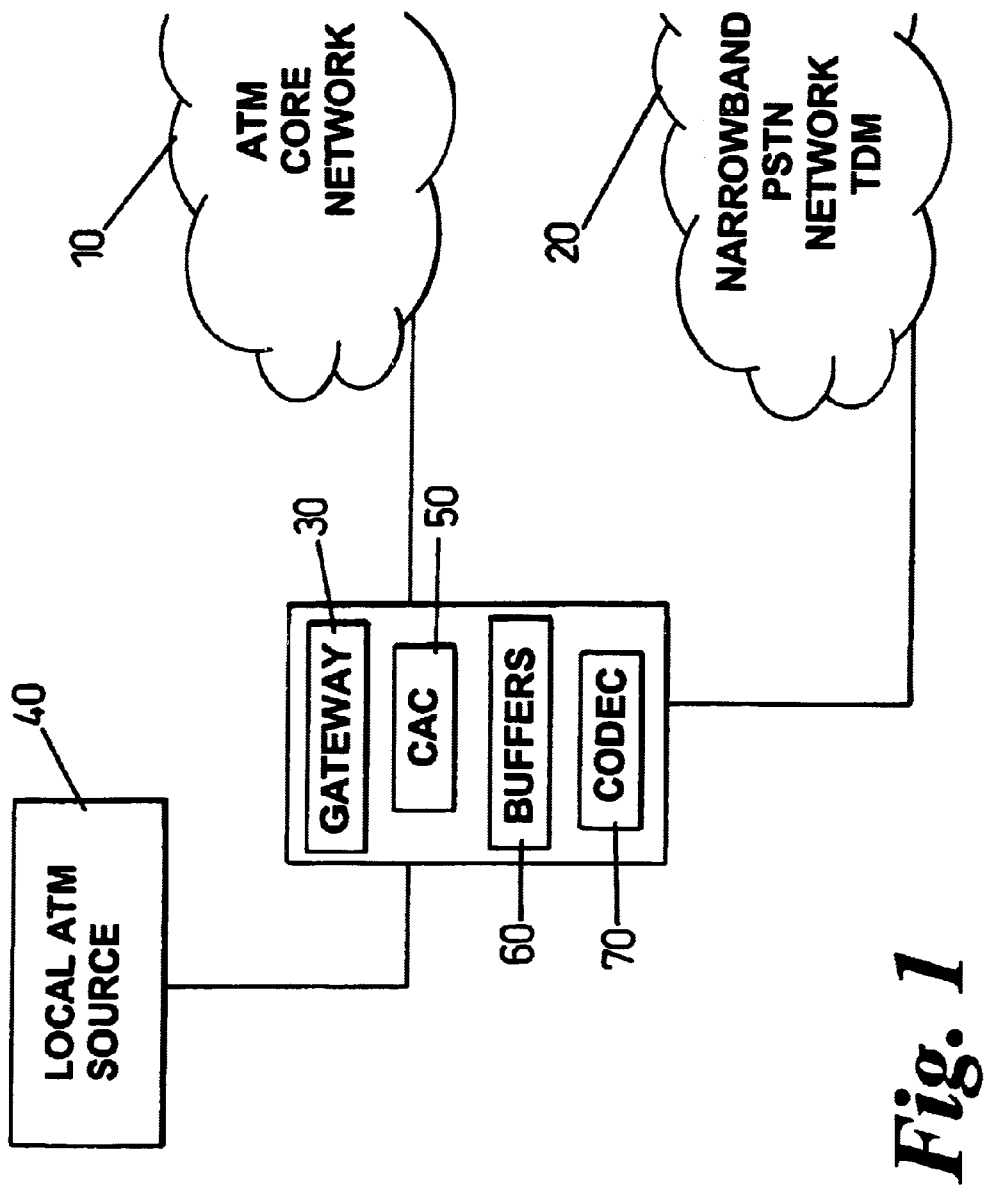
FIG. 1 illustrates a network environment in schematic form.

FIG. 1 shows in schematic form a network environment in which connection admission control may be used as will be described. An ATM core network 10 is connected to a narrow band PSTN (public service telephone network) 20 via a gateway 30. The gateway is also coupled to a local ATM source 40. The gateway includes a connection admission control function 50, typically implemented in software running on conventional processing hardware. The gateway also includes buffers 60 and Codec circuits 70 for converting between TDM (time division multiplex) signals from the PSTN network, and ATM cells. When a call is made from the PSTN network to any destination connected to the ATM core network, the gateway will receive a call admission request. The CAC function 50 will determine whether the link to a next node (not illustrated) in the ATM core network, has sufficient bandwidth to accept the call without affecting any qualify of service, contracts or guarantees which are in place either for the requested call, or for existing connections (which may be voice calls or data connections). As illustrated, the ATM core network uses AAL2 (ATM adaption layer 2). Such networks are well known and need not be described further in detail here. The ATM link to the local ATM source 40 may also use AAL2. The connection admission control function 50 may also control admission of ATM connections on virtual channels requested by the local ATM source 40, for admission to the ATM core network. The gateway may have other functions and connections not directly related to CAC, and therefore not illustrated. For example, there may be separate connections to network management systems, to signalling networks such as an SS7 network associated with the PSTN.

Figure 2:
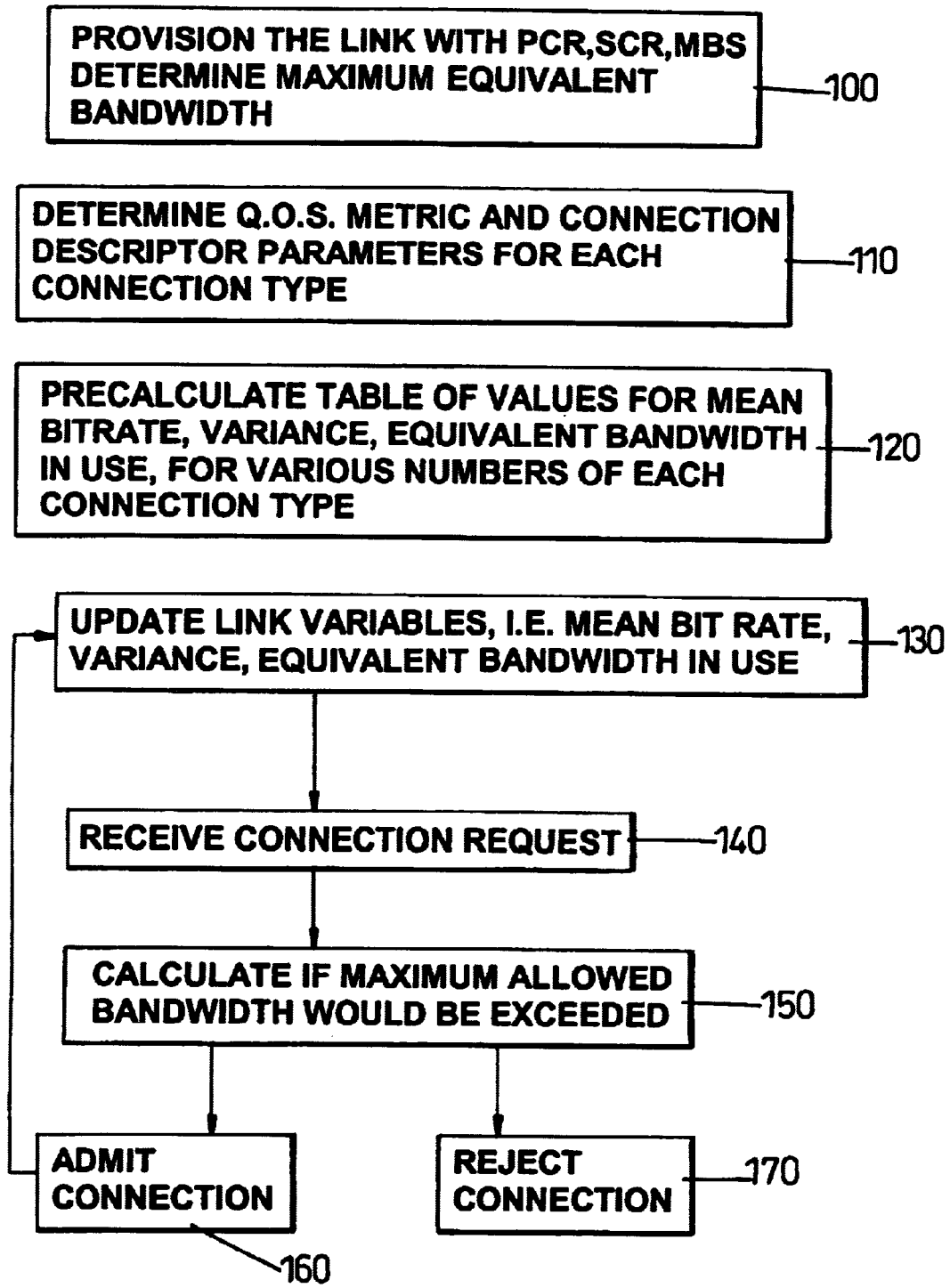
FIG. 2 shows in schematic form the operation of the gateway shown in FIG. 1.

FIG. 2—Operation of the Gateway

FIG. 2 shows in schematic form some of the principal functions of the gateway. Steps 100, 110, and 120 are carried out during configuration of provisioning of the gateway. Other steps are carried out during operation of the gateway. At step 100, the gateway is provisioned with some of the variables describing the link with the ATM core network (and potentially for other links also). If the link is a CBR (constant bit rate) link, then the PCR (peak cell rate) is defined. If the link is a variable bit rate (VBR) link, the gateway needs to know its PCR, SCR (sustained cell rate) and MBS (maximum burst size). This can enable the maximum allowable bandwidth, known as equivalent cell rate ECR to be determined.

At step 110, a quality of service (QOS) matrix and parameters of connections (connection descriptor parameters) must be agreed for each type of connection. This needs to be determined by the network operator. Typically the call descriptor parameters may include a peak rate $R^{peak}$, b (mean duration of active period (talk spurt), and p (fraction of time source active). Connection types may include those defined by well known IT used standards G.729,G726, G711, which define codec parameters. There may be two types of connection for each codec standard, depending on whether silence suppression is on or off. At step 120, a table of values for mean bit rate, variance and equivalent band width in use is calculated for various numbers of each connection type. These may be incremental values in the sense of the additional equivalent band width for one further connection, which for any given connection may be a different value depending on whether there are five existing connections or fifty existing connections. Accordingly, this look up table contains values which represent a non-linear relationship between the equivalent bandwidth in use and the number of connections. More specifically, the table contains delta values suitable for adding to running totals referred to below as link variables. The delta values are non-linearly related to the number of connections, but the delta values may themselves be added in a linear fashion to the running totals.

The pre-calculated table may be a one-dimension look-up table accessible according to the number of connection types, or may be a two-dimensional table accessible by number of connections, and connection type. Other dimensions can be conceived to improve the accuracy. The number of dimensions, and the granularity of the table can be determined according to storage limitations, speed of access to the table, and required accuracy as desired.

At step 130 the link variables mentioned above, which are running totals of mean bit rate, variance, and equivalent band width in use are maintained, starting at zero when the network is initialised.

At step 140 a connection request is received. This may be either from another node in the ATM network, in which case the algorithm is being used for flow control, i.e. admission to the next link, within the ATM network. If the connection request is received from outside the ATM network, the algorithm is being used for controlling admission to the network.

At step 150 it is calculated whether the acceptance of the connection request would result in the maximum allowed bandwidth for the virtual circuit being exceeded. If no, at 160 the connection is admitted, and the link variables are updated. If the maximum allowed bandwidth would be exceeded, the connection is rejected at step 170. Updating the link variables involves a straightforward summation of their running total and the delta values taken from the recalculated table.

Figure 3:
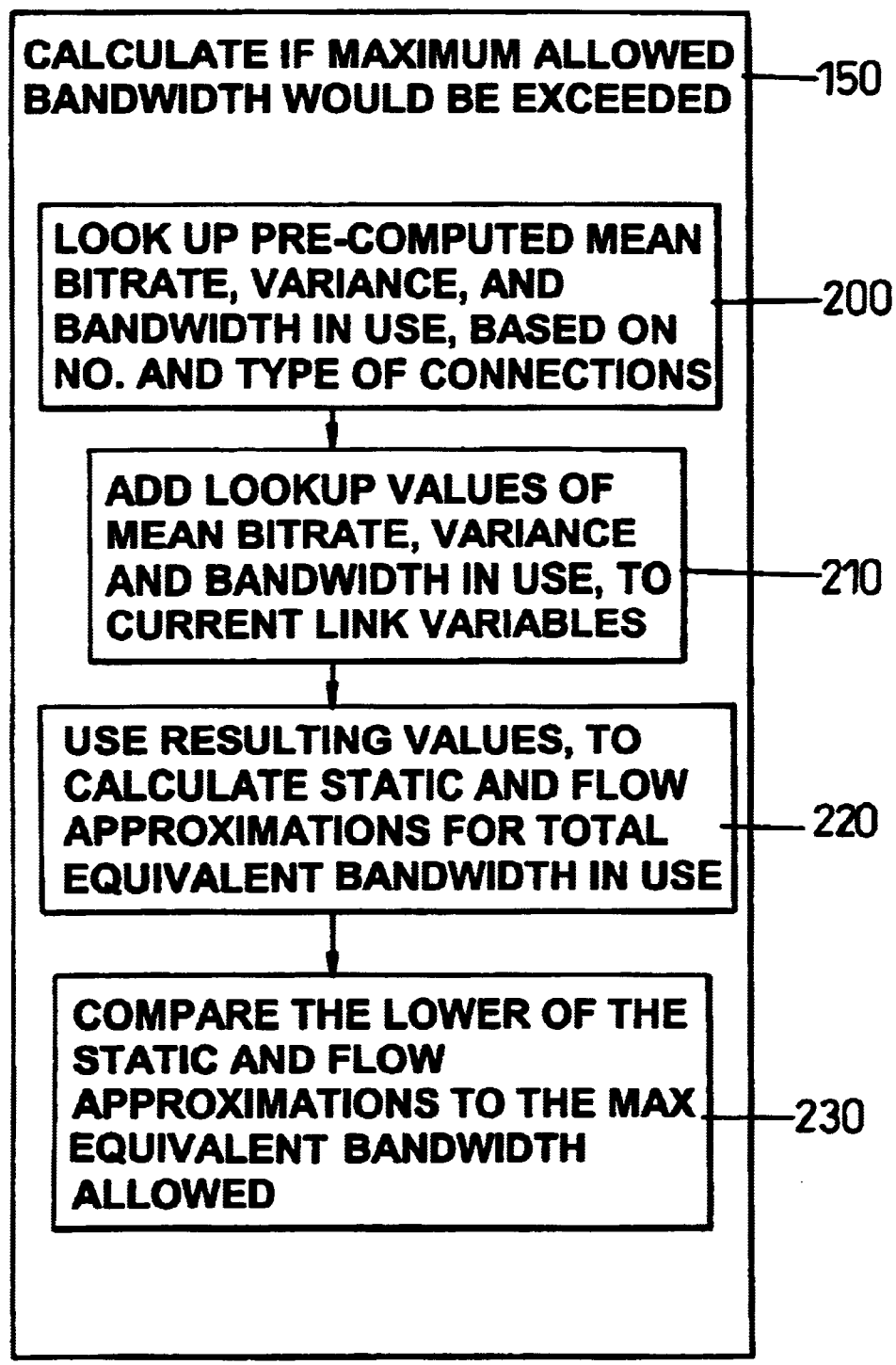
FIG. 3 shows the bandwidth calculation of FIG. 2 in more detail.

The calculation step 150 of whether the maximum allowed bandwidth would be exceeded is shown in more detail in FIG. 3.

FIG. 3, Bandwidth Calculation

FIG. 3 shows in more detail the steps involved in calculating if the maximum allowed bandwidth would be exceeded. At step 200, the look up table is used for looking up pre computed values for the mean bit rate, the variance, and the bandwidth to be used based on the number and type of connections. The above referenced paper by Guerin et al shows that an approximation based on a combination of a fluid flow approximation and a stationary or static approximation gives results to an exact evaluation of equivalent capacity as defined by equation one $$\epsilon = \beta \cdot \exp\left(-\frac{K(c - \rho R_{peak})}{b(1-\rho)(R_{peak} - c)c}\right)$$

where $$\beta = \frac{(c - \rho R_{peak}) + \epsilon \rho(R_{peak} - c)}{(1-\rho)c}$$

$R_{peak}$=Peak rate $\epsilon$=Probability of overflow (i.e. CLR)
 c=Equivalent capacity
K=Buffer size $\rho$=Fraction of time source active b=Mean duration of active period (talk spurt)

As this equation is computationally extremely strenuous the approximation using the minimum of the fluid flow approximation and the stationary approximation as proposed by Guerin and shown in equation two is used $$C = \min\left\{\sum_{i=1}^{N} m_i + a'\sqrt{\sum_{i=1}^{N} \sigma_i^2}, \sum_{i=1}^{N} c_i\right\}$$

where $$a' = \sqrt{-2\ln(\varepsilon) - \ln(2\pi)}$$

$m_L$=Mean bit-rate of $i^{th}$ source
$R_{peaki}$=Peak rate of $i^{th}$ source
$\sigma_i^2$=Variance of $i^{th}$ source, $=m_i x(R_{peaki} - m_i)$
$\epsilon$=Probability of overflow (i.e. CLR)
$C_s$=the total equivalent bandwidth of N channels As can be seen, this equation is based on values of mean bit rate. Variance, and bandwidth used (otherwise termed equivalent capacity). At steps 210 and 220 of FIG. 3, these values are determined by adding the look up values which represent the increment or delta beyond the current running totals of these values, to the existing running totals. The resulting values are used to calculate static and flow approximations and thus the resulting equivalent bandwidth to be in use if the requested connection is to be admitted.

At step 230, this result is compared to the maximum equivalent bandwidth allowed, to determine if this maximum allowed bandwidth be exceeded.

If so, the connection is rejected. This would normally cause the connection to be dropped if the algorithm is being used for admission to the ATM network. If the algorithm is being used for a link in the ATM network, rejection of the admission request may result in a request for admission to a different link, to bypass the congested link.

Figure 4:
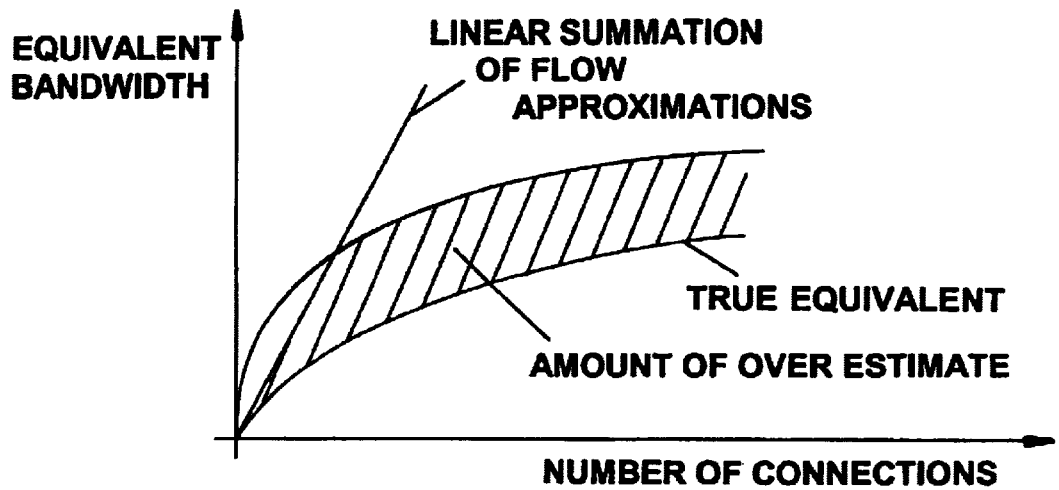
FIG. 4 shows a graph of equivalent bandwidth versus number of connections, according to the prior art.
Figure 5:
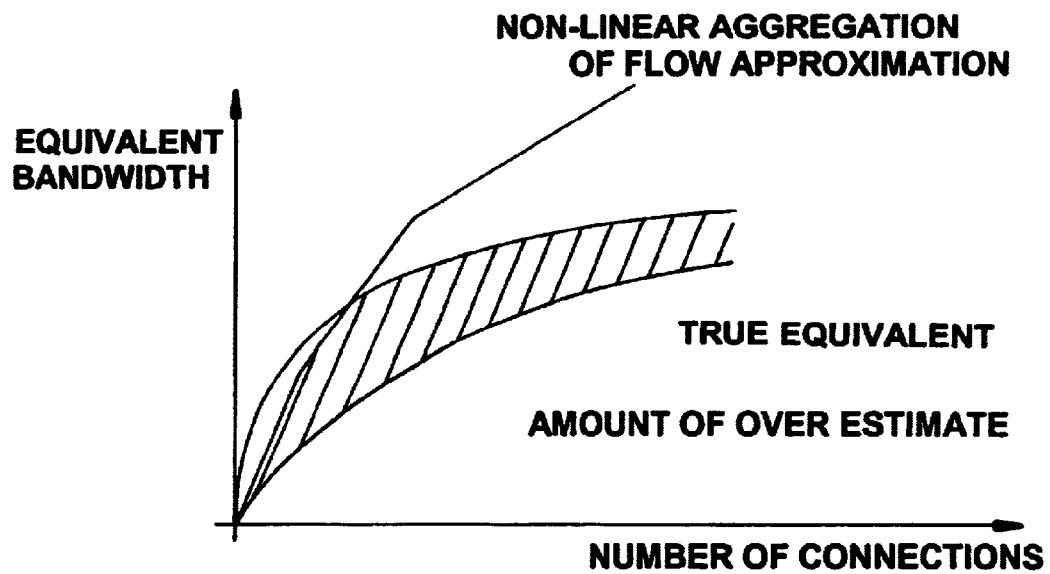
FIG. 5 shows a graph of equivalent bandwidth versus number of connections, according to an embodiment of the invention.

FIGS. 4 AND 5, Illustration of the approximations to the true equivalent bandwidth FIG. 4 shows a graph of an example of how a true equivalent bandwidth value may vary with the number of connections and how the approximations vary in this respect. Above the line for the true equivalent bandwidth is the static approximation. The flow approximation posed by Guerin is determined using a linear aggregation as the number of connections increases. This therefore appears as a straight line on FIG. 4

As shown in FIG. 5, this line according to the invention may be a more accurate approximation if it is aggregated in a non-linear fashion as the number of connections increases.

Other Examples, Variations

Other variations of the described embodiments, and other applications of the invention can be conceived and are intended to be within the scope of the claims.

What is claimed is:

1. Admission control apparatus for controlling admission of connections to a network, the apparatus comprising:

circuitry for receiving a request for admitting a connection to the network, circuitry for determining whether to admit the requested connection according to whether a bandwidth used would exceed a maximum bandwidth allowed for at least a portion of the network, and circuitry for determining the bandwidth used, by determining an aggregate equivalent bandwidth of all connections in the portion of the network, by determining a static approximation and a flow approximation, the flow approximation having a non-linear relationship to the number of connections.

2. The admission control apparatus of claim 1 wherein the connections may be of more than one type, and the determination of the flow approximation is made according to the type of the connection.

3. The admission control apparatus of claim 1 further comprising a look up table accessible according to the number of connections, for providing a value of equivalent bandwidth for use in the determination of the flow approximation.

4. The admission control apparatus of claim 1 wherein the determination of the flow approximation is based on a pre-computed evaluation of a relationship between parameters of the connection, a quality of service metric and the equivalent bandwidth.

5. The admission control apparatus of claim 1 wherein the network comprises an ATM network.

6. The admission control apparatus of claim 1 wherein the network comprises an IP network.

7. The admission control apparatus of claim 1 wherein the determination of the flow approximation is adjustable in operation according to measurements of actual performance.

8. The admission control apparatus of claim 1 wherein the parameters of the connection comprise a peak rate value.

9. The admission control apparatus of claim 1 wherein the parameters of the connection comprise a mean duration of an active period, and a fraction of time the connection is actively used.

10. Admission control apparatus for controlling admission of connections to a network, the apparatus comprising:

circuitry for receiving a request for admitting a connection to the network, circuitry for determining whether to admit the requested connection according to whether a total bandwidth used would exceed a maximum bandwidth allowed for at least a portion of the network, and circuitry for determining the total bandwidth used, by determining a flow approximation based on pre computed numeric evaluation of a relationship between parameters of the requested connection, a quality of service metric and the equivalent bandwidth, said flow approximation having a non-linear relationship to the number of connections.

11. Apparatus for controlling utilisation of a resource in a network, the apparatus comprising:

circuitry for determining an equivalent bandwidth of an aggregated information flow having a number of connections, in the network, by determining a static approximation and a flow approximation for the equivalent bandwidth, the flow approximation having a non-linear relationship to the number of connections, and circuitry for controlling the resource on the basis of the equivalent bandwidth.

12. A method for controlling admission of connections to a network, comprising the steps of:

receiving a request for admitting a connection to the network, determining whether to admit the requested connection according to whether a bandwidth used would exceed a maximum bandwidth allowed for at least a portion of the network, and determining the bandwidth used, by determining an aggregate equivalent bandwidth of all connections in the portion of the network, by determining a static approximation and a flow approximation, the flow approximation having a non-linear relationship to the number of connections.

13. A method of controlling admission of connections to a network, comprising the steps of:

receiving a request for admitting a connection to the network, determining whether to admit the requested connection according to whether a total bandwidth used would exceed a maximum bandwidth allowed for at least a portion of the network, and determining the total bandwidth used, by determining a flow approximation based on pro computed numeric evaluation of a relationship between parameters of the requested connection, a quality of service metric and the equivalent bandwidth, said flow approximation having a non-linear relationship to the number of connections.

14. A method of controlling utilisation of a resource in a network, comprising the steps of:

determining an equivalent bandwidth of an aggregated information flow having a number of connections, in the network, by determining a static approximation and a flow approximation for the equivalent bandwidth, the flow approximation having a nonlinear relationship to the number of connections, and controlling the resource on the basis of the equivalent bandwidth.

15. Software for carrying out the method of claim 11.

16. Software for carrying out the method of claim 12.

17. Software for carrying out the method of claim 13.

18. A method of transmitting data traffic via a node of a network, the node using the apparatus of claim 1 in transmitting the traffic.

* * * * *